United States Patent [19]

Kawaki et al.

[11] 4,162,418
[45] Jul. 24, 1979

[54] STEPPING MOTOR FOR ELECTRONIC CLOCK

[75] Inventors: Katsumi Kawaki; Shinya Inabe, both of Kawasaki, Japan

[73] Assignee: Niles Parts Co., Ltd., Japan

[21] Appl. No.: 791,777

[22] Filed: Apr. 28, 1977

[30] Foreign Application Priority Data

Dec. 14, 1976 [JP] Japan .................. 51-167551[U]

[51] Int. Cl.² .............................................. H02H 37/17
[52] U.S. Cl. ................................. 310/49 R; 310/163; 310/164; 58/23 D
[58] Field of Search ............................... 310/162–165, 310/49, 40 MM; 58/23 D

[56] References Cited

U.S. PATENT DOCUMENTS

| 3,857,053 | 12/1974 | Yatsushiro et al. | 310/164 X |
| 3,989,967 | 11/1976 | Kikuyama et al. | 310/49 X |
| 4,004,168 | 1/1977 | Haydon | 310/164 X |
| 4,048,548 | 9/1977 | Nakajima et al. | 310/162 X |
| 4,055,785 | 10/1977 | Nakajima et al. | 310/49 X |
| 4,066,947 | 1/1978 | Nakajima et al. | 310/49 X |
| 4,088,909 | 5/1978 | Matsumura et al. | 310/49 |

Primary Examiner—Donovan F. Duggan
Attorney, Agent, or Firm—Lane, Aitken & Zeims

[57] ABSTRACT

A compact stepping motor for an electronic clock which features high stability in the direction of the motor rotation and small electric power consumption is provided with a rotor and a stator that surrounds the rotor and includes portions having a recess formed therein and two pairs of projecting magnetic pole pieces positioned asymmetrically relative to the end of their respective recesses.

1 Claim, 6 Drawing Figures

STEPPING MOTOR FOR ELECTRONIC CLOCK

BACKGROUND OF THE INVENTION

The present invention relates to an improved stepping motor for driving the hands of an electronic clock, and, more especially, to a stepping motor which produces a relatively large torque and in which there is no need to adjust the stators surrounding the rotor to determine the direction of the rotor's rotation.

The stepping motor in a conventional electronic clock is generally driven by periodic positive and negative electric signals of a square or a rectangular wave with a duty cycle of 50% to drive the stepping motor in the predetermined constant direction, where the electric signal is provided by an electronic circuit essentially composed of a crystal oscillator, a frequency divider, and an amplifier.

In order to greatly reduce the average current consumption of an electronic clock, it is also known to drive a stepping motor by a square wave with a smaller duty cycle than 50% or a pulse current having a changing and discharging characteristics.

These driving signals are, however, insufficient to provide a stepping motor with sufficiently high efficiency such that the average current consumption is reduced and, further, the torque from the stepping motor is increased in a stable manner.

Further, it is necessary in a conventional stepping motor for an electronic clock to adjust the stator of the motor to determine the direction of the motor's rotation, and to laminate iron cores of different formation to form the stator, which results in complex motor assembly, an inaccurate stepping angle for the motor, and a reduction of the stepping motor torque.

SUMMARY OF THE INVENTION

It is an object of the present invention to provide an improved stepping motor for an electronic clock which overcomes the disadvantages mentioned above.

Another object of the present invention is to provide a stepping motor with high efficiency for an electronic clock in which the average current consumption is reduced and the torque derived from the stepping motor is increased in a stable manner.

A further object of the present invention is to provide a stepping motor in which adjustment of the stator surrounding the rotor of the stepping motor is not necessary to determine the direction of the rotor's rotation.

DESCRIPTION OF THE PREFERRED EMBODIMENTS

Figure 1:
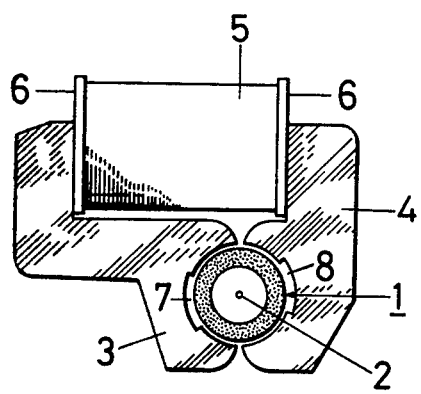
FIG. 1 is an elevational view of the stepping motor of the present invention.
Figure 2:
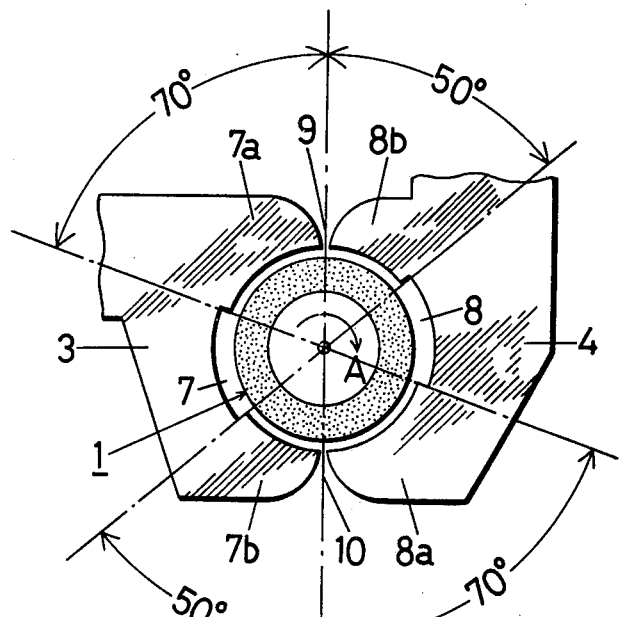
FIG. 2 is an enlarged detail of a main portion of the stepping motor of the present invention and which show the construction of the main portion.

Referring to FIG. 1, the reference numeral 1 designates a cylindrical permanent magnet rotor having six magnetic poles equally divided with each other, and the numerical 2 designates a shaft for a rotation of the rotor 1. The numerals 3 and 4 designate a pair of stators formed from a ferro-magnetic material. One end of each stator surrounds the rotor 1 with a small air gap. The other ends of the stators 3 and 4 are inserted into a bobbin 6 wound with a motor coil 5. The coil 5 is excited by a pulse current issued from a conventional electronic circuit (not shown) to produce a magnetic force which is conducted through the stators 3 and 4 to magnetic pole pieces 7a, 7b, 8a, and 8b. The numerals 9 and 10 designate pole gaps, i.e., air gaps, between the stators 3 and 4.

The configuration of the magnetic pole pieces is such that the magnetic pole pieces 7b and 8b are located, in projecting fashion, within an angular range of 50° from the gaps 10 and 9, respectively, in the direction A of rotation of the rotor 1; and recess portions 7 and 8 are subsequently located within an angular range of 60° from the terminal ends of the pole pieces 7b and 8b, respectively, in the same direction A; and the magnetic pole pieces 7a and 8a are subsequently located in projecting fashion, within an angular range of 70° from the terminal ends of the recess portions 7 and 8 to the gaps 9 and 10, respectively. A pair of the magnetic pole pieces 7a and 8a, and 7b and 8b is symmetrically arranged in opposite relationship with respect to the shaft 2, and, similarly, a pair of the recess portions 7 and 8 is also symmetrically arranged with respect to the shaft 2.

The operation of the a stepping motor having the construction described above is shown in FIGS. 3 to 6.

Figure 3:
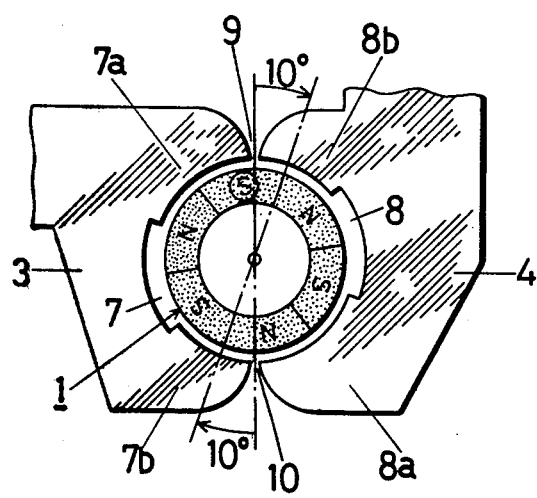
FIGS. 3 to 6 are elevational views of the main portion showing the operation of the stepping motor.
Figure 5:
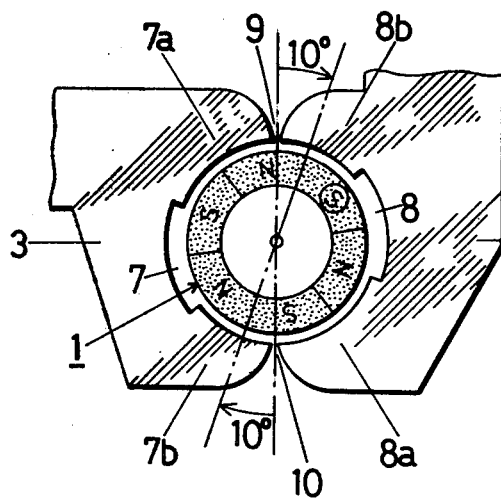

During the non-excitation period of the motor coil 5, the coil 5 does not produce a magnetic force, and, consequently, rotor 1 is at rest in either of the rotor positions shown in FIG. 3 or 5. In the at rest position of the rotor 1 shown in FIGS. 3 and 5, two of the boundarys of the magnetic poles of the rotor 1 are shifted by about 10° from the pole gaps 9 and 10 in the direction A.

Figure 4:
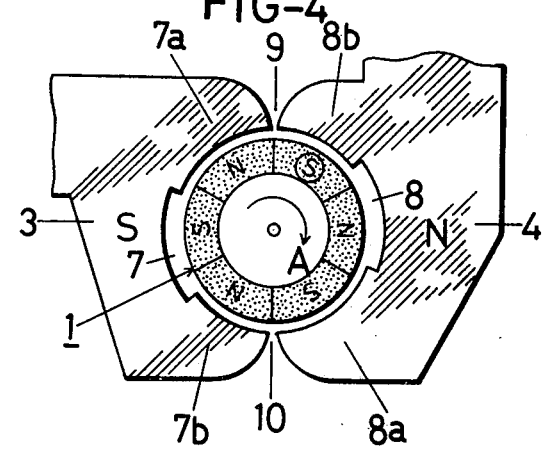

During the excitation period of the motor coil 5 at the rest position of the rotor 1 shown in FIG. 3, the coil 5 produces a magnetic force to provide magnetic poles S and N at the stators 3 and 4, respectively, as shown in FIG. 4. Two of the magnetic poles S of the rotor 1 are strongly attracted to the magnetic pole pieces 8a and 8b acting as a N pole; similarly two of the poles N of the rotor 1 are strongly attracted to the pole pieces 7a and 7b acting as a S pole as shown in FIG. 4. By such attraction the two boundarys of rotor's poles adjacent to the gaps become substantially consistent with the pole gaps 9 and 10 with the rotor 1 rotating by 50° in the direction A as shown in FIG. 4, compared to the position of the rotor in FIG. 3.

It is an important matter for the advantages of the present invention that the above attracting force is produced within a wide range which is substantially all ranges of the pole pieces 7a, 7b, 8a and 8b, and that the magnetic poles S and N of the rotor 1 opposite to the recess portions 7 and 8, respectively, are apart from the magnetic poles S and N of the stator 3 and 4, respectively, by the recess portions 7 and 8, so that the above attracting force is not reduced by the magnetic poles S and N of the rotor 1 oppsite to the recess portions 7 and 8.

Thus the attracting force can be produced at the very wide range of 240° out of 360°, so that a large motor torque can be obtained.

In the excitation state of the coil 5 as shown in FIG. 4, when the pulse current is interrupted, the rotor 1 is slightly rotated thereby to establish the at-rest position of the rotor 1 shown in FIG. 5.

The above slight rotation of the rotor 1 at the interruption perod of the pulse current is caused by the novel construction of the magnetic pole pieces that the range or width of the projected pole pieces 7b and 8b is smaller than that of the projected pole pieces 7a and 8a, and by a principle that the magnetic flux flowing from the N pole and S pole opposite to the pole pieces 7a and 8a, respectively, in FIG. 4 to the S pole and N pole opposite to the recess portion 7 and 8 respectively in FIG. 4 tends inherently to pass through the pole piece 7a and 8a respectively.

By means of such slight rotation of the rotor 1 at the interruption period of the pulse current, the direction of the rotor's rotation is maintained with high stability and accuracy.

Figure 6:
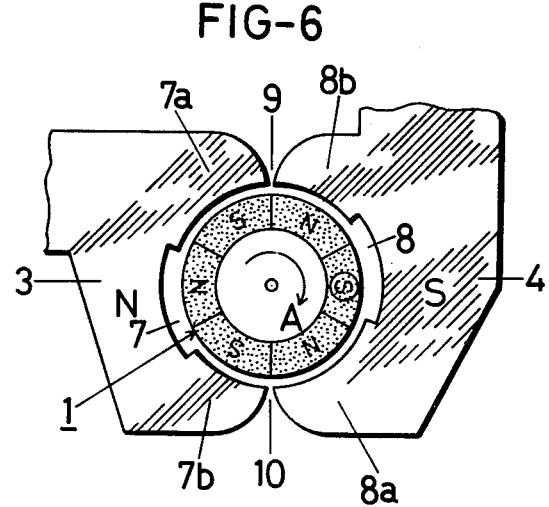

In next excitation period of the coil 5 with a pulse current which is reverse of the pulse current mentioned with regard to FIG. 4, the coil 5 produces a magnetic flux to produce magnetic poles N and S at the stators 3 and 4, respectively, as shown in FIG. 6. The magnetic pole N, a part of which is opposite to next pole piece 7a in FIG. 5, is strongly attracted to the pole piece 8b acting as a S pole; similarly the pole S, a part of which is opposite to the pole piece 8a in FIG. 5, is also strongly attracted to the pole 7b acting as a N pole.

Accordingly, the rotor 1 is rotated by about 50° in the direction A by means of the above energization of the coil 5 as shown in FIG. 6. The state of the rotor 1 shown in FIG. 6 is the most stable position of the rotor 1 under the maximum attraction force.

In the above mentioned embodiment the angle of the slight rotation is set at 10°, however the angle may be preferably setable at one third of the rotation angle of a rotor for each pulse is 360° divided by a number of magnetic poles.

According to the present invention, a stepping motor for an electronic clock having the following advantages can be provided.

a. The direction of a rotor's rotation is easily maintained with high stability and accuracy in a predetermined direction without any adjustment of a stator by means of a construction that includes two pairs of magnetic pole pieces which are different in width or range of angle from each other.

b. An attraction force between a rotor and magnetic pole pieces is increased by projecting pole pieces associated with recess portions of a stator thereby providing rotor angle of high accuracy, accurate stop motion, and also providing increased motor torque.

c. Stators can be composed of a simple formation thereby affording convenient mass production of the stator and the stepping motor.

d. A magnetic flux produced by a motor coil can be utilized with high efficiency, so that an average current consumption of the motor can be preferably reduced.

e. A cylindrical rotor can be composed of a simple formation thereby affording convenient mass production thereof and reducing the cost of the motor.

What is claimed is:

1. A stepping motor for an electronic clock comprising a motor coil for producing a magnetic force in response to a pulse current provided from a predetermined electronic circuit, a stator for conducting said magnetic force, and a rotor to be rotated by the action of said magnetic force conducted by said stator, said stator having two pairs of projecting portions and a pair of recess portions surrounding said rotor, said recess portions each having a recess formed therein, said rotor composed of a cylindrical permanent magnet having six magnetic poles equally divided with each other, said projecting portions and said recess portions respectively symmetrically located with respect to a rotor shaft, wherein one projecting portion of each pair of said projecting portions is respectively located within an angular range of 50° from a pole gap in a predetermined direction of rotation of said rotor, each one of said recess portions subsequently located with an angular range of 60° from the terminal end of the said one projecting portion in said predetermined direction as above, and the other of each pair of said projecting portions being respectively located within an angular range of 70° from the terminal end of said recess portion in said predetermined direction.

* * * * *